United States Patent [19]

Kay et al.

[11] Patent Number: 4,747,620
[45] Date of Patent: May 31, 1988

[54] SECURITY CARD AND SECURITY CARD BLANK

[75] Inventors: Ralph Kay, Berkshire; Martin C. Gomme, Hertsfordshire, both of England

[73] Assignee: The De La Rue Company PLC, England

[21] Appl. No.: 895,927

[22] Filed: Aug. 13, 1986

[30] Foreign Application Priority Data

Aug. 28, 1985 [GB] United Kingdom ................. 8521363

[51] Int. Cl.$^4$ ............................................. B42D 15/00
[52] U.S. Cl. ........................................ 283/86; 283/904
[58] Field of Search ........................ 283/75, 77, 83, 86, 283/88, 904; 346/76 L, 134, 135; 219/121 LF; 430/157, 270, 271, 273, 945

[56] References Cited

U.S. PATENT DOCUMENTS

| | | |
|---|---|---|
| 3,506,779 | 4/1970 | Brown et al. . |
| 3,560,994 | 2/1971 | Wolff et al. ........................ 346/135 |
| 3,640,009 | 2/1972 | Komiyama ........................ 283/88 |
| 3,647,275 | 3/1972 | Ward ................................ 283/86 |
| 3,947,661 | 3/1976 | Silverman et al. . |
| 4,000,492 | 12/1976 | Willens . |
| 4,119,361 | 10/1978 | Greenaway . |
| 4,309,713 | 1/1982 | Shinozaki ........................ 346/135.1 |
| 4,352,706 | 10/1982 | Miller .............................. 283/88 |
| 4,501,439 | 2/1985 | Antes .............................. 283/86 |
| 4,547,002 | 10/1985 | Colgate, Jr. ..................... 283/86 |
| 4,587,535 | 5/1986 | Nakane et al. .................. 346/135.1 |

FOREIGN PATENT DOCUMENTS

| | | |
|---|---|---|
| 0151706 | 8/1985 | European Pat. Off. . |
| 3030260 | 3/1982 | Fed. Rep. of Germany . |
| 2496938 | 6/1982 | France . |
| WO82/02969 | 9/1982 | PCT Int'l Appl. . |
| 1264712 | 2/1972 | United Kingdom . |
| 1275929 | 7/1972 | United Kingdom ............ 346/76 R |

*Primary Examiner*—Paul A. Bell
*Attorney, Agent, or Firm*—Ostrolenk, Faber, Gerb & Soffen

[57] ABSTRACT

A security card blank comprises a plurality of superposed layers (5,5',6,7,8,9) including a metallic layer (5,5'). The metallic layer comprises any radiation absorbent, metal, metalloid, or their alloys or derivatives, such as oxides or sulphides. The metallic layer (5,5') is positioned within the card blank and is imageable only under the influence of high intensity radiation to produce a security card. After imaging, at least part of the imaged metallic layer is detectable from outside the card.

32 Claims, 1 Drawing Sheet

SECURITY CARD AND SECURITY CARD BLANK

FIELD OF THE INVENTION

The invention relates to security cards and blanks from which such security cards are produced. In this specification security cards include all types of card which are used to identify or authorize the bearer. One group of such security cards includes bank cards such as credit cards, cash cards, debit cards, identification cards, and cheque guarantee cards. Other security cards are used to enable the bearer of the card to gain access to a building, service, or country and the like and for example to use vending machines.

DESCRIPTION OF THE PRIOR ART

The main purpose of a security card is to identify uniquely the bearer of the card and this is normally done by including within the card certain information which is unique and characteristic of the bearer of the card. This information may include the bearer's signature and/or a photoimage of the bearer or other indication such as the bearer's initials or a unique code.

A further requirement of security cards is that they are substantially tamper proof and resistant to counterfeit copying methods. Many attempts have been made to prevent counterfeiting including the printing of complex patterns on the card which are difficult to reproduce. The problem with these methods are firstly that the time for manufacturing the card significantly increases with the complexity of the anti-forging patterns and secondly more sophisticated equipment is now becoming generally available making these anti-counterfeiting systems less effective.

DE-A-No. 3030260 describes an identification card having a metal deposition on a bottom layer. The metal layer is relatively thick to allow electrical conduction so that it can be encoded by making use of its electrosensitive property. This results in evaporation of parts of the layer. This method is time consuming and expensive and results in a relatively expensive product due to the slow and complex equipment required. It is also susceptible to counterfeiting due to the straightforward imaging method particularly if card blanks are available.

SUMMARY OF THE INVENTION

We provide, in accordance with one aspect of the present invention, a security card blank comprising a plurality of superposed layers including a metallic layer as hereinafter defined positioned within the card blank, the metallic layer being imageable under the influence of high intensity radiation to produce a security card, whereby, after imaging, at least part of the imaged metallic layer is detectable from outside the card.

We have discovered that the use of such a metallic layer in a security card not only leads to a significant increase in security against both alteration and copying but also enables information to be accurately and rapidly provided in the metallic layer.

In this context, "metallic" is herein defined as including radiation absorbent metals, metalloids, and their alloys or derivatives, such as oxides or sulphides.

Preferred metallic layers include nichrome of various compositions, chromium, stainless steel, and related metals having a melting point in the range 1500°-2000° C. The choice of metal is generally governed by the wavelength of the imaging radiation. These metals are particularly advantageous because they provide durable images not readily produced by lower intensity sources, thus increasing security.

A further significant advantage is that the metallic layer may be very thin which enables the card blank layers to be more securely bonded together and increases imaging accuracy. For example, layers having thicknesses up to 100 nm, preferably in the order of 5–30 nm, most preferably 15 nm are suitable. We have discovered that certain metallic thin films surprisingly exhibit a relatively high degree of radiation absorbence. For example, chromium will absorb about 40% of incident laser light. In all cases, the electrical conductivity of the preimaged metallic layer is very low.

The use of thin metallic layers is useful during manufacture of the card since these layers can be coated onto a substrate using a known technique such as vacuum evaporation, sputtering by RF, electron beam techniques and the like.

The high intensity radiation typically has a power in the range 4–10 watts with a beam diameter of about 25 microns. For example, 4–5 watts is suitable for a 5 nm thick nichrome layer; 6 watts for a 20 nm thick stainless steel layer; and 6–8 watts for nichrome layers up to 40 nm thick. Preferably the radiation is optical radiation such as is generated by a relatively high power laser e.g. a YAG laser. For example, a laser beam having a wavelength of about 1.06 microns within the infrared range, and a 25 micron spot diameter is particularly suitable. However other relatively high power radiation sources would be suitable provided the radiation is sufficiently absorbed by the metallic layer.

The, the metallic layer is only imageable with high intensity radiation. This leads to considerable security against conterfeiting even if the conterfeiter obtains a card blank.

It should be noted that materials which are commonly used for laser imaging such as bismuth are not suitable in the invention since the relatively high intensity radiation used would probably cause vaporization of the metal. Also such low melting point layers are more readily imaged by lower power sources and have reduced security.

The invention should be contrasted with the disclosure in DE-No. 3030260 in which the metal layer (typically aluminum) does not absorb imaging radiation and is considerably thicker then is required by the invention in order to ensure electrical conduction. We have conducted electrical conductivity experiments on metallic films suitable with our invention and coated on a plastics substrate which show that for a 6 cm long, 2 mm wide metal track, a 40 nm thick nichrome film has a resistance of about 3.2 kΩ while at lower thicknesses conductivity becomes very unreliable and is zero at 10 nm.

Preferably, the perimeter of the metallic layer is spaced from the edges of the card blank. This enables a secure bond to be achieved between the layers.

In accordance with a second aspect of the invention, a security card comprising a plurality of superposed layers including a metallic layer as hereinbefore defined positioned within the card, the metallic layer being imageable under the influence of high intensity radiation, the metallic layer carrying an image detectable from outside the card.

The security card could be constructed in a variety of ways, for example by imaging the metallic layer and then assembling the layers together. Alternatively, the card could be constructed from a blank according to the first aspect of the invention. This is described in more detail in our copending U.S. application Ser. No. 892,920 filed Aug. 13, 1986 and entitled "Manufacturing Security Cards".

The security card may be assembled using any conventional technique such as compression between plastic skins in a hot press, adhesive bonding using a liquid, tape/film adhesive, hot melt adhesives, radio frequency and ultrasonic welding etc.

The metallic layer may be imaged using a dispersion imaging technique in which the metallic layer is selectively melted and redistributed to give regions of much lower optical density and large optical contrast. During dispersion imaging fracture of highly stressed metallic layers can cause the metallic particles to curl up and become less visible as part of the overall mechanism.

The image in the metallic layer may include one or more portions, some of which may be unique to the bearer of the card. For example, the image portions may include the name of the issuing institution, a representation of the bearer's signature, the bearer's initials, photoimage and the like.

Preferably, the image in the metallic layer is visible to the unassisted human eye from at least one side of the card. In some arrangements, however, it may be feasible for the imaged information only to be detectable at non-visible wavelengths or by high resolution microscopy.

The imaging referred to may be of a negative or positive kind in which a majority of the metallic layer in an area is respectively left or redistributed to give low optical density or optical contrast.

There may be additional layers positioned between the outer layers and the metal layer may be coated on any internal surface defined by the outer or additional layers providing the image is detectable from outside the card.

At least one layer should have a sufficient thickness to provide the card with rigidity. Typically this layer will constitute all or part of a core.

In one example two core layers are provided sandwiched between the outer layers, an internal surface of one of the outer layers carrying the metallic layer.

It should be understood that more than one metallic layer could be provided.

The layer(s) on which each metallic layer is coated may comprise a base material such as thin plastic foil, coated paper, or other such carrier. A layer such as coated aluminum foil could be used. The material should be selected so as to be suitable for thin metal films to be applied. In general, glossy surfaces are preferable.

Alternative materials for the base material could be polymer films such as polycarbonate, polyester and PVC and these may be clear or pigmented.

In some examples, the metal layer may be coated on a core layer.

The other layers making up the card may have a conventional constitution and are typically polymers such as PVC. These layers may carry other information, printed or embossed in a conventional manner.

In some cases, if all the layers are transparent to detection wavelengths (e.g. visually transparent), the metallic layer or layers may be visible from both sides of the card.

The security card may contain one or more additional security features. Some of these features may be associated with image portions in the metallic layer which may itself contribute to the feature. For example, the card of blank may comprise a reflection hologram or transparent device contained in a layer adjacent (preferably in contact with) the metallic layer, part of the metallic layer being positioned behind the hologram or transparent device to provide a reflecting surface cooperating with the hologram device. That part may include an image portion such as the bearer's initials, provided the hologram or transparent device is transparent to the high power imaging radiation.

In other examples, where opaque optical security features are provided, the metallic layer may be positioned over the feature so that after imaging, all or part of the security feature is visible through the metallic layer. Again, this part of the metallic layer may include an image portion.

Other security features may be constituted by the use of additional layers which are translucent or fluorescent.

In one particularly convenient arrangement, the metallic layer is sandwiched between a pair of inorganic release layers of either the same or different composition. The inorganic release layers may be made from a material such as germanium oxide, titanium oxide, indium tin oxide, low melting glasses and the like. Other possible materials include a film forming low melting organic coating such as wax, vinyl, rubber etc.

BRIEF DESCRIPTION OF THE DRAWINGS

Some examples of security cards and a security blank according to the invention will now be described with reference to the accompanying drawings in which.

DETAILED DESCRIPTION OF THE EMBODIMENTS

Figure 1B:
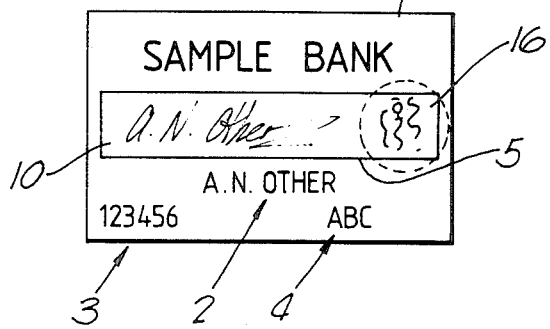
FIG. 1B is a plan of a security card.
Figure 1A:
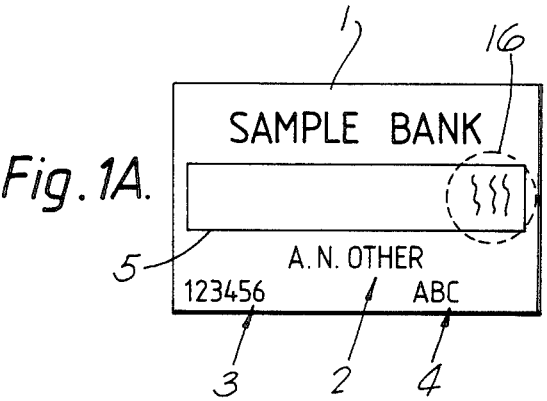
FIG. 1A is a plan of a security blank

The security blank shown in FIG. 1A may constitute an identification card and comprises a number of plastic (e.g., PVC) layers and at least one metallic layer. Information such as the name of the issuing institution 1, the name of the bearer 2, and other coded information 3, 4 is provided on one or more of the plastics layers by printing. The layers are assembled together and at least partially bonded and then the metallic layer 5 is imaged using a high intensity laser beam to be described. FIG. 1B illustrates the finished card after the metallic layer has been imaged.

Figure 2:
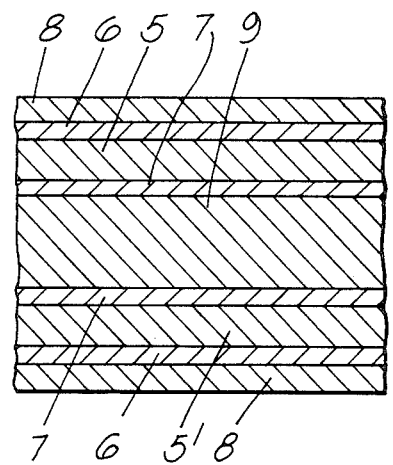
FIG. 2 is an enlarged, partial cross-section through one example of a card; and, FIG. 3 is an enlarged, partial cross-section through a second example of a card.

FIG. 2 illustrates the construction of one example of a card having a pair of metallic layers, 5, 5' each having a thickness of about 15 nm and comprising stainless steel. A pair of release layers 6, 7 are provided on either side of each metallic layer 5 and 5'. Each release layer 6, 7 has a thickness of about 10 nm and may consist of the same or different materials. Each composite structure of metallic layer 5 or 5' and release layers 6, 7 is provided on a respective optically transparent PVC film substrate 8 having a thickness of about 75 microns (although thicknesses may range between 50 and 250 microns) which forms a cover or outer layer of the card. In addition a single ply PVC core layer 9 is sandwiched between the release layers 7. The core layer 9 may have a thickness in the range 200–600 microns.

In one method of manufacture, a release layer 6 and metallic layer 5 are deposited in turn onto a film substrate 8 by vacuum deposition. The substrate 8 may comprise for example PVC while the release layer 6 comprises germanium oxide. The release layer 7 is then coated by vacuum deposition onto the metallic layer 5. The release layer 7 may comprise the same material as the release layer 6 or for example a film forming low melting organic coating such as wax. A second composite structure of metallic layer 5', release layers 6, 7 and film substrate 8 is produced and both structures are assembled and at least partially bonded to the core layer 9. This results in a card blank.

The stainless steel metallic layers 5, 5' are then exposed to a laser beam from a YAG laser which is controlled such that the metallic layers 5, 5' are dispersion imaged. The images produced on the metallic layers 5, 5' may comprise one or more of the bearer's signature and photoimage and may also include graphics, numerals, or other security features such as the bearer's fingerprint. FIG. 1B illustrates the layer 5 carrying the bearer's signature 10.

If desired, further layers can be provided on the basic assembly shown in the drawings. The different layers are then finally bonded together in any conventional manner such as by adhesive bonding using a hot melt adhesive and/or a lamination technique. It will be seen from FIG. 1 that the metal layer 5 is spaced from the edges of the card to enable a strong bond to be achieved between the other layers.

Figure 3:
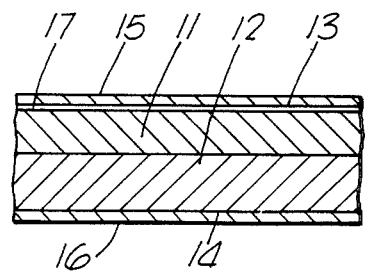

The security card illustrated in FIG. 3 comprises a pair of white PVC core layers 11, 12 having outwardly facing surfaces 13, 14 respectively on which information such as that shown at 1–4 in FIG. 1 is printed. This information will be of a conventional form and may relate to the organization issuing the card etc. In addition, one or both of the surfaces 13, 14 could carry security printing.

A pair of outer layers 15, 16 are positioned on either side of the core layers 11, 12. Each layer 15, 16 is formed of clear PVC and has a thickness of about 75 microns. The inwardly facing surface of the layer 15 is coated with a metallic layer 17 such as nichrome having a thickness of about 15 nm. The method of assembly and imaging of this card will be substantially the same as in the FIG. 1 example. In this case the card is only imageable on one side which is appropriate for cheque guarantee cards.

In some cases, the inner surface of the outer layer 15 may have part of an optical device incorporated into it. For example, the inner surface could be impressed with a hologram 16 (FIG. 1) or diffraction grating or grid pattern. If the metallic layer is left unchanged underneath this portion of the outer layer 15, it will cause incident light to be reflected through the hologram or diffraction grating thus producing an additional optical security feature. Conveniently, however, this part of the metallic layer includes an image portion such as the bearer's initials (not shown).

Typically other information on the card will be printed on the core layer 12 or embossed after manufacture through the layers 8, 5, 12. The embossed information may also comprise personalized information.

We claim:

1. A security card blank comprising a plurality of superposed layers including a metallic layer selected from the group of radiation absorbent metals, metalloids and their alloys and derivatives, said metallic layer being positioned within the card blank, said metallic layer being imageable under the influence of high intensity radiation to produce a security card, said metallic layer having a melting point in the range 1500°–2000° C., whereby, after imaging, at least part of said imaged metallic layer is detectable from outside said card.

2. A security card blank according to claim 1, wherein said metallic layer has a thickness in the range 5–30 nm.

3. A security card blank according to claim 1, wherein said metallic layer absorbs, and is imageable with, infra-red radiation.

4. A security card blank according to claim 1, wherein said metallic layer defines a perimeter, said perimeter of said metallic layer being spaced from the edges of the card blank.

5. A security card constructed from a blank according to claim 1, wherein said metallic layer carries an image which is detectable from outside the card.

6. A security card according to claim 5, wherein said image in said metallic layer includes at least one portion which contains information unique to the bearer of the card.

7. A security card according to claim 6, wherein said image comprises a representation of the signature of the bearer of the card.

8. A security card blank according to claim 1, wherein said metallic layer is imageable under the influence of radiation with a power in the range of substantially 4–10 watts.

9. A security blank according to claim 8, wherein said radiation has a beam diameter of about 25 microns.

10. A security card comprising a plurality of superposed layers including a metallic layer selected from the group of radiation absorbent metals, metalloids and their alloys and derivatives, said metallic layer being imageable under the influence of high intensity radiation, said metallic layer carrying an image detectable from outside the card, and said metallic layer having a melting point in the range 1500°–2000° C.

11. A security card according to claim 10, wherein said image in said metallic layer includes at least one portion which contains information unique to the bearer of the card.

12. A security card according to claim 11, wherein said image comprises a representation of the signature of the bearer of the card.

13. A security card according to claim 10, wherein at least a portion of said image in said metallic layer is visible to the unassisted human eye.

14. A security card according to claim 10, further comprising one of a reflection hologram and a transparent optical device contained in a layer adjacent said metallic layer, part of said metallic layer being positioned behind said hologram or transparent device to provide a reflecting surface cooperating with said hologram or device.

15. A security card according to claim 10, wherein said metallic layer is imageable under the influence of radiation with a power in the range of substantially 4–10 watts.

16. A security card according to claim 15, wherein said radiation has a beam diameter of about 25 microns.

17. A security card blank comprising a plurality of superposed layers including a metallic layer selected from the group of radiation absorbent metals, metalloids and their alloys and derivatives, said metallic layer being positioned within the card blank, said metallic layer being imageable under the influence of high intensity radiation to produce a security card, said metallic layer being selected from the group consisting of nichrome, chromium and stainless steel, whereby, after imaging, at least part of said imaged metallic layer is detectable from outside said card.

18. A security card blank according to claim 17, wherein said metallic layer has a thickness in the range 5–30 nm.

19. A security card blank according to claim 17, wherein said metallic layer absorbs, and is imageable with, infrared radiation.

20. A security card blank according to claim 17, wherein said metallic layer defines a perimeter, said perimeter of said metallic layer being spaced from the edges of the card blank.

21. A security card constructed from a blank according to claim 17, wherein said metallic layer carries an image which is detectable from outside the card.

22. A security card according to claim 21, wherein said image in said metallic layer includes at least one portion which contains information unique to the bearer of the card.

23. A security card according to claim 22, wherein said image comprises a representation of the signature of the bearer of the card.

24. A security card blank according to claim 17, wherein said metallic layer is imageable under the influence of radiation with a power in the range of substantially 4–10 watts.

25. A security card blank according to claim 24, wherein said radiation has a beam diameter of about 25 microns.

26. A security card comprising a plurality of superposed layers including a metallic layer selected from the group of radiation absorbent metals, metalloids and their alloys and derivatives, said metallic layer being imageable under the influence of high intensity radiation, said metallic layer carrying an image detectable from outside the card, and said metallic layer being selected from the group consisting of nichrome, chromium and stainless steel.

27. A security card according to claim 26, wherein said image in said metallic layer includes at least one portion which contains information unique to the bearer of the card.

28. A security card according to claim 27, wherein said image comprises a representation of the signature of the bearer of the card.

29. A security card according to claim 26, wherein at least a portion of said image in said metallic layer is visible to the unassisted human eye.

30. A security card according to claim 26, further comprising one of a reflection hologram and a transparent optical device contained in a layer adjacent said metallic layer, part of said metallic layer being positioned behind said hologram or transparent device to provide a reflecting surface cooperating with said hologram or device.

31. A security card according to claim 26, wherein said metallic layer is imageable under the influence of radiation with a power in the range of substantially 4–10 watts.

32. A security card according to claim 31, wherein said radiation has a beam diameter of about 25 microns.

* * * * *